United States Patent
Shaikh et al.

(10) Patent No.: US 11,314,304 B2
(45) Date of Patent: Apr. 26, 2022

(54) DATACENTER POWER MANAGEMENT USING VARIABLE POWER SOURCES

(71) Applicant: Virtual Power Systems, Inc., Milpitas, CA (US)

(72) Inventors: Karimulla Raja Shaikh, Cupertino, CA (US); Nikhil Sharma, El Dorado Hills, CA (US); Ravi Subramaniam, San Jose, CA (US); Shankar Ramamurthy, Saratoga, CA (US)

( * ) Notice: Subject to any disclaimer, the term of this patent is extended or adjusted under 35 U.S.C. 154(b) by 0 days.

(21) Appl. No.: 15/680,286

(22) Filed: Aug. 18, 2017

(65) Prior Publication Data
US 2018/0052431 A1    Feb. 22, 2018

Related U.S. Application Data

(60) Provisional application No. 62/376,881, filed on Aug. 18, 2016.

(51) Int. Cl.
*G05B 13/04* (2006.01)
*G06F 1/26* (2006.01)
(Continued)

(52) U.S. Cl.
CPC ............ *G06F 1/30* (2013.01); *G05B 13/042* (2013.01); *G05B 13/048* (2013.01); *G06F 1/263* (2013.01);
(Continued)

(58) Field of Classification Search
CPC ..... G06F 1/28; G06F 1/30; G06F 1/32; G06F 1/263; G06F 1/266; G06F 1/3206;
(Continued)

(56) References Cited

U.S. PATENT DOCUMENTS 6,031,298 A * 2/2000 Lo .............................. H02J 1/10
307/44
6,396,170 B1 5/2002 Laufenberg et al.
(Continued)

FOREIGN PATENT DOCUMENTS

EP          2372861 B1    10/2011
JP     2009232521 A    10/2009
(Continued)

OTHER PUBLICATIONS

Metcalf, Jeffrey, "Power Efficiency Comparison: Cisco UCS® 5108 Blade Server Chassis and HP BladeSystem® c7000 Enclosure", Copyright Sep. 2013, Cisco.
(Continued)

*Primary Examiner* — M. N. Von Buhr

(57) ABSTRACT

Embodiments provide techniques for datacenter power management using variable power sources. Power from the variable power sources is stored in a power cache. An optimization engine receives input criteria such as power availability from non-variable and variable power sources, as well as one or more power management goals. The optimization engine implements a dispatch strategy that dispatches stored energy from the power cache and feeds it to the datacenter, resulting in a mixture of non-variable and variable power sources used to achieve the power management goals, such as reduced power cost, increased power availability, and lowered carbon footprint for the datacenter.

25 Claims, 11 Drawing Sheets

(51) Int. Cl.

| | | |
|---|---|---|
| *H02J 3/00* | (2006.01) | |
| *G06F 1/30* | (2006.01) | |
| *G06F 9/48* | (2006.01) | |
| *G06F 1/28* | (2006.01) | |
| *G06F 1/3206* | (2019.01) | |
| *H02J 3/46* | (2006.01) | |
| *G06F 1/32* | (2019.01) | |
| *H02J 3/38* | (2006.01) | |
| *G06F 9/50* | (2006.01) | |
| *G06F 1/3209* | (2019.01) | |
| *H02J 3/14* | (2006.01) | |

(52) U.S. Cl.
CPC ............... *G06F 1/266* (2013.01); *G06F 1/28* (2013.01); *G06F 1/32* (2013.01); *G06F 1/3206* (2013.01); *G06F 1/3209* (2013.01); *G06F 9/4893* (2013.01); *G06F 9/5094* (2013.01); *H02J 3/38* (2013.01); *H02J 3/382* (2013.01); *H02J 3/46* (2013.01); *H02J 3/003* (2020.01); *H02J 3/0073* (2020.01); *H02J 3/14* (2013.01); *Y02D 10/00* (2018.01)

(58) Field of Classification Search
CPC .... G06F 1/3209; G06F 9/4893; G06F 9/5094; G06F 1/26; G05B 13/042; G05B 13/048; G05B 13/04; H02J 3/14; H02J 3/46; H02J 3/006; H02J 3/382; H02J 2003/003; H02J 3/38; H02J 3/381; H02J 3/003; H02J 3/0073; H02J 2300/20; H02J 2300/22; H02J 2300/10; H02J 2310/16; Y02D 10/22; Y02D 10/00; Y02B 70/3225; Y04S 20/222
See application file for complete search history.

(56) References Cited

U.S. PATENT DOCUMENTS

| | | | |
|---|---|---|---|
| 6,967,283 B2 | 11/2005 | Rasmussen et al. | |
| 7,236,896 B2 | 6/2007 | Farkas et al. | |
| 7,742,830 B1* | 6/2010 | Botes | G06F 9/4843 700/32 |
| 8,067,857 B2* | 11/2011 | Humphrey | G06F 1/263 307/82 |
| 8,193,662 B1 | 6/2012 | Carlson et al. | |
| 8,359,598 B2* | 1/2013 | Diwakar | G06F 9/5094 718/102 |
| 8,464,080 B2 | 6/2013 | Archibald et al. | |
| 8,527,619 B2 | 9/2013 | Ewing et al. | |
| 8,589,929 B2* | 11/2013 | DeCusatis | G06F 9/5094 718/100 |
| 8,595,379 B1 | 11/2013 | Brandwine | |
| 8,645,150 B2* | 2/2014 | Akers | G06Q 10/10 705/1.1 |
| 8,793,365 B2* | 7/2014 | Arsovski | G06F 9/5027 709/224 |
| 8,839,254 B2* | 9/2014 | Horvitz | G06F 9/4893 718/102 |
| 8,958,923 B2 | 2/2015 | Kake et al. | |
| 9,058,156 B2* | 6/2015 | Alshinnawi | G06F 1/189 |
| 9,218,035 B2* | 12/2015 | Li | G06F 1/263 |
| 9,342,375 B2* | 5/2016 | Hyser | G06F 9/5094 |
| 9,641,025 B2 | 5/2017 | Agrawal et al. | |
| 9,654,414 B2* | 5/2017 | Chatterjee | H04L 47/70 |
| 9,800,052 B2* | 10/2017 | Li | H02J 3/32 |
| 9,865,998 B1 | 1/2018 | Emert et al. | |
| 9,871,408 B2* | 1/2018 | Narita | H02J 9/061 |
| 9,910,472 B1* | 3/2018 | Wishman | G06F 1/30 |
| 9,923,414 B2* | 3/2018 | Ahdoot | H02J 9/062 |
| 10,028,405 B1* | 7/2018 | Gandhi | H05K 7/1492 |
| 10,164,464 B1* | 12/2018 | Ross | H02J 9/061 |
| 10,175,737 B1* | 1/2019 | Kong | G06F 1/30 |

| | | | |
|---|---|---|---|
| 2003/0056125 A1 | 3/2003 | O'Conner et al. | |
| 2005/0006956 A1* | 1/2005 | Shi | H02J 1/102 307/43 |
| 2005/0071092 A1 | 3/2005 | Farkas et al. | |
| 2005/0162019 A1 | 7/2005 | Masciarelli et al. | |
| 2006/0082222 A1 | 4/2006 | Pincu et al. | |
| 2007/0216229 A1 | 9/2007 | Johnson et al. | |
| 2008/0067872 A1 | 3/2008 | Moth | |
| 2008/0320322 A1 | 12/2008 | Green et al. | |
| 2009/0144568 A1 | 6/2009 | Fung | |
| 2010/0037070 A1 | 2/2010 | Brumley et al. | |
| 2010/0037225 A1* | 2/2010 | Doyle | G06F 1/3203 718/102 |
| 2010/0058092 A1 | 3/2010 | Bougaev et al. | |
| 2010/0077238 A1 | 3/2010 | Vogman et al. | |
| 2010/0102633 A1* | 4/2010 | Seaton | H02J 9/06 307/64 |
| 2010/0205469 A1 | 8/2010 | Mccarthy et al. | |
| 2010/0211810 A1 | 8/2010 | Nacho | |
| 2010/0264741 A1 | 10/2010 | Togare | |
| 2010/0328849 A1 | 12/2010 | Ewing et al. | |
| 2010/0332873 A1* | 12/2010 | Munjal | G06F 1/3203 713/320 |
| 2011/0068625 A1* | 3/2011 | Duan | H02J 9/061 307/29 |
| 2011/0133559 A1 | 6/2011 | Yamashita et al. | |
| 2011/0245988 A1 | 10/2011 | Ingels et al. | |
| 2011/0264937 A1 | 10/2011 | Meisner et al. | |
| 2011/0302432 A1 | 12/2011 | Harris et al. | |
| 2011/0304211 A1 | 12/2011 | Peterson et al. | |
| 2012/0053925 A1* | 3/2012 | Geffin | H05K 7/1498 703/21 |
| 2012/0054512 A1 | 3/2012 | Archibald et al. | |
| 2012/0066519 A1 | 3/2012 | El-Essawy et al. | |
| 2012/0303993 A1 | 11/2012 | Nishtala et al. | |
| 2013/0082529 A1* | 4/2013 | Wolter | H02J 3/005 307/46 |
| 2015/0051749 A1* | 2/2015 | Hancock | G06Q 50/06 700/295 |
| 2015/0057821 A1 | 2/2015 | Nasle | |
| 2015/0121113 A1* | 4/2015 | Ramamurthy | H02J 9/061 713/340 |
| 2015/0134443 A1* | 5/2015 | Hallak | G06Q 30/0242 705/14.41 |
| 2015/0221036 A1* | 8/2015 | Sharma | G06Q 40/06 705/36 R |
| 2015/0227864 A1* | 8/2015 | Payne | G06Q 10/0635 705/348 |
| 2015/0234440 A1* | 8/2015 | Gardner | G06F 1/30 713/300 |
| 2015/0277410 A1* | 10/2015 | Gupta | H02J 3/008 700/295 |
| 2015/0331467 A1* | 11/2015 | Kaplan | G06F 1/30 713/300 |
| 2015/0378408 A1* | 12/2015 | Kaplan | H05K 7/1492 713/300 |
| 2015/0380968 A1 | 12/2015 | Lee | |
| 2016/0020609 A1 | 1/2016 | Carrasco et al. | |
| 2016/0109916 A1* | 4/2016 | Li | H02J 9/062 700/295 |
| 2016/0156189 A1* | 6/2016 | Ci | H02J 3/38 700/297 |
| 2016/0209901 A1 | 7/2016 | Wilcox et al. | |
| 2016/0320825 A1 | 11/2016 | Panda et al. | |
| 2016/0322828 A1* | 11/2016 | Vogel | H02J 3/383 |
| 2017/0005515 A1 | 1/2017 | Sanders | |
| 2017/0025876 A1 | 1/2017 | Chan | |
| 2017/0124894 A1* | 5/2017 | Essafi | G06Q 10/00 |
| 2017/0170683 A1* | 6/2017 | Navarro | H02M 7/44 |
| 2017/0177047 A1* | 6/2017 | Fluman | H02J 3/008 |
| 2017/0201425 A1 | 7/2017 | Marinelli et al. | |
| 2017/0322241 A1 | 11/2017 | Tang et al. | |
| 2017/0359922 A1* | 12/2017 | Bailey | H05K 7/1498 |
| 2018/0029620 A1* | 2/2018 | Wait | B61L 3/006 |

(56) References Cited

U.S. PATENT DOCUMENTS

2018/0107940 A1* 4/2018 Lieberman .............. G06F 16/35
2019/0122132 A1 4/2019 Rimini et al.

FOREIGN PATENT DOCUMENTS

WO WO2011119444 A2 9/2011
WO WO2012091323 A2 7/2012

OTHER PUBLICATIONS

"VMware® Distributed Power Management Concepts and Use", White Paper, Copyright 2010 VMware, Inc., 3401 Hillview Avenue Palo Alto CA 94304 USA.
Mammano, Bob, "Load Sharing with Paralleled Power Supplies", Copyright 2001, Texas Instruments Incorporated, Dallas, Texas.
Muccini, Mark, el al., "Power Consumption Reduction: Hot Spare", A Dell technical white paper, Feb. 2012, Rev. 1.0, Dell, Inc.
Meisner, David, Brian T. Gold, and Thomas F. Wenisch. "PowerNap: eliminating server idle power." ACM SIGARCH Computer Architecture News 37.1 (2009): 205-216.
International Search Report dated Feb. 9, 2015 for PCT/US2014/062650.
International Search Report dated Jan. 30, 2015 for PCT/US2014/062684.

* cited by examiner

DATACENTER POWER MANAGEMENT USING VARIABLE POWER SOURCES

RELATED APPLICATIONS

This application claims the benefit of U.S. provisional patent application "Automated Intelligent Scheduling of Energy Storage in Data Centers" Ser. No. 62/376,881, filed Aug. 18, 2016. The foregoing application is hereby incorporated by reference in its entirety.

FIELD OF ART

This application relates generally to power control and more particularly to datacenter power management using variable power sources.

BACKGROUND

Many modern businesses and institutions rely on datacenters for various aspects of their business. The datacenter is a facility that houses an organization's information technology (IT) operations and equipment, and where it stores, manages, and disseminates its data. Datacenters play a key role in ecommerce systems, video streaming, government, and various other enterprises. Datacenters contain various critical systems belonging to an enterprise network, and thus are vital to maintaining continuous operations. The equipment can include computing equipment, communication equipment, and heating, ventilation, and air conditioning (HVAC) equipment that is used to maintain a proper operating temperature for the IT equipment within the datacenter.

For datacenter power requirements, electricity costs can be a considerable portion of the operating budget. Datacenters can house many rows of servers, storage devices, routers, and other IT equipment placed together in racks, and thus the electricity consumption of the datacenters is often very high to power and cool the facility effectively. Additionally, the power demand for both industrial applications and datacenters can fluctuate based on various business factors, such as the time of day or season. Thus, managing power becomes an important aspect in many industrial applications, including datacenter administration. Even further, any energy savings achieved can translate into increased profit margins for an organization. Additionally, energy savings can provide additional dividends in terms of reduced wear and tear on power sources and reduced cooling costs, adding to the received benefit of an organization.

Within datacenters, also known as "server farms," there can be hundreds or even thousands of racks. The devices on the racks provide functionality, including the storage, processing, and retrieval of data. Given the power requirements demanded by the rack-mounted devices, reliable and efficient power delivery is crucial for successful operation of the organizations using the datacenters. In some cases, the reliability and availability obligations placed on the devices powering the datacenter infrastructure must meet or exceed predetermined statutory requirements, as is the case of financial institutions.

Regardless of the type of institution, various infrastructure requirements must be met in order to address the important issues of availability, reliability, job load, and other organizational requirements of datacenters. For example, the issue of effectively cooling a datacenter (i.e. the removal of excess heat) is a critical issue which must be addressed to ensure reliable operation of the datacenter. Many of the devices in the datacenter generate substantial amounts of heat. The cooling of modern datacenters can directly impact the layout and design of the center. Another significant datacenter design consideration involves providing sufficient power to the datacenter. Particularly in the case of high-reliability datacenters, such as those used for ecommerce, banking, airline reservations, video distribution, and the like, power can be provided by more than one power grid, while for other datacenters, power can be provided by a combination of a power grid and locally generated power. Thus, providing reliable and efficient power to the large number of computers and associated equipment in modern datacenters or server farms is an important aspect contributing to the performance of these operations.

SUMMARY

Datacenters consume large amounts of power to operate computers and other associated equipment, as well as for operating massive air conditioning units to keep the equipment cool. It is therefore desirable to utilize alternative energy sources and/or renewable energy sources to power some or all of the datacenter. Since generation of renewable energy is not completely predictable in many cases, it is advantageous to have techniques for optimizing the utilization of variable and non-variable energy sources.

Embodiments include a computer-implemented method for power management comprising: provisioning one or more variable power sources across a datacenter to provide power to computing devices within the datacenter; obtaining one or more non-variable power sources across the datacenter to provide power to the datacenter; calculating dynamic power needs for the computing devices within the datacenter; determining power capabilities of the one or more non-variable power sources; determining power capabilities of the one or more variable power sources; evaluating the dynamic power needs that were calculated in light of the power capability of the one or more variable and non-variable power sources; and coupling the one or more non-variable power sources and the one or more variable power sources to the computing devices based on the evaluation of the dynamic power needs.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
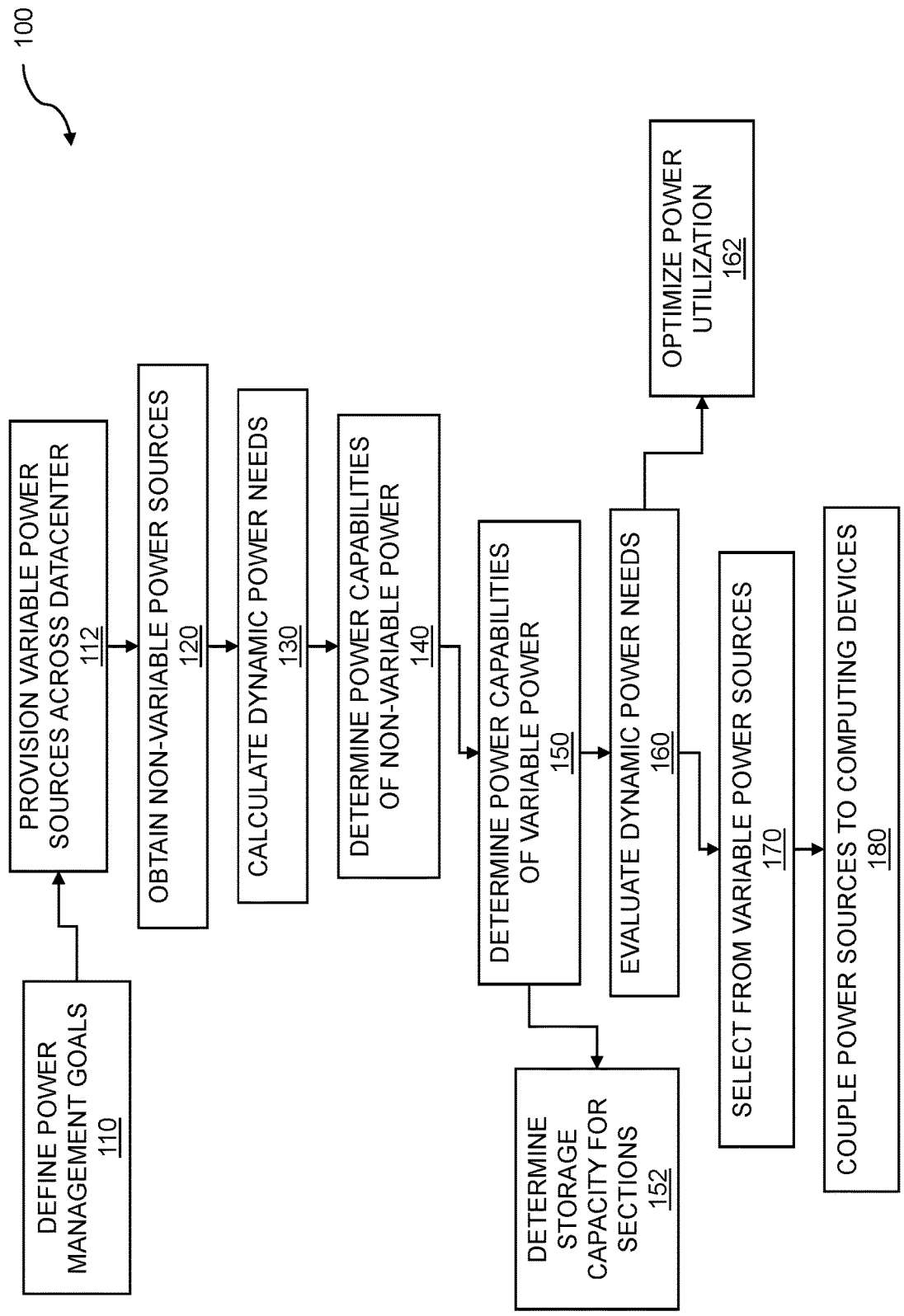
FIG. 1 is a flow diagram for datacenter power management using variable power sources.

Disclosed techniques provide datacenter power management using variable power sources. Power sources can broadly be categorized as variable power sources or non-variable power sources. Examples of non-variable power sources include power generation from fossil fuel power plants (e.g. coal, natural gas, and the like), nuclear power, and river-based hydroelectric power (e.g. generation from water turbines collocated within a dam). Examples of variable power sources include power sources such as solar power sources, wind power sources, and tidal power sources. Variable power sources experience periods of little or no power output, depending on a variety of conditions.

Solar power sources produce power during daylight hours, but are affected by the weather, as cloud cover hampers the power output of a solar power source. Furthermore, solar power can have seasonal variation as well. For example, in some locations, the number of hours of daylight in summer is considerably more than in winter. Wind power sources can operate at any time of day, but the output power is a function of wind. Since winds change as weather patterns pass through an area, a wind power source can have a widely varying output, depending on current weather conditions. Tidal power sources may rely on flow of water induced by tides. In some areas, such as a tidal inlet, a strong current can be induced as low or high tide approaches. The water current induced by the tides can drive a water turbine that can be used to generate power. The amount of power produced varies based on the water current flow. The water current flow at any given moment is based largely on the daily tidal cycle. Additionally, tidal power can further be influenced by the lunar monthly cycle over the course of new moon to full moon and back to new moon again.

Variable power sources can have natural cyclic variation. For example, tidal power sources are affected by the daily and monthly tidal cycles. Tidal power is an example of a volatile power source with natural cyclic variation. Variable power sources can be volatile, where the power output can exhibit acyclic behavior. For example, wind power output can fluctuate based on wind speed. Solar power output has a cyclical component of day/night cycles, and also a volatile component of cloud cover, which can occur with an element of randomness. Thus, in embodiments, the variable power sources provide power in a volatile fashion. In some embodiments, the volatile fashion includes natural cyclic variation. In embodiments, the natural cyclic variation includes light cycles, wind cycles, or tidal cycles.

As datacenters consume large amounts of power, there is benefit to combining variable power sources with non-variable power sources to achieve various power management goals. The power management goals can include, but are not limited to, goals of power availability, power cost, and/or carbon footprint goals. Disclosed embodiments can achieve increased efficiency and/or redundancy by optimizing power management using the one or more goals. The optimization can include intelligent storage and dispatching of variable power based on a variety of factors including, but not limited to, power management goals, current/forecast power demand, and current/forecast variable power output. By incorporating these factors into a dynamic power analysis, it is possible to improve efficiency over a worst-case analysis of datacenter power requirements.

FIG. 1 is a flow diagram for datacenter power management using variable power sources. The flow 100 includes defining power management goals 110. The power management goals can include power availability. Various pieces of equipment within a datacenter, such as servers, switches, routers, storage arrays, and the like, can be configured as 1N redundancy or 2N redundancy. Equipment configured in 2N redundancy mode is fed from two independent power sources, such that if one power source fails, the equipment remains operational using the other connected power source. Various pieces of equipment within the datacenter may be dual-corded, such that they can accept power from two independent power sources. Other equipment may be single-corded, such that it can only operate with 1N redundancy. In practice, there may be a mix of 1N configured equipment and 2N configured equipment within a datacenter. Equipment configured with 2N redundancy is more impervious to power disruptions. Hence, for the goal of availability, it is desirable to configure as many pieces of equipment as possible in 2N redundancy. In this case, power generated from the volatile power sources can be used to supply additional power to dual-corded equipment to allow it to be configured in 2N redundancy.

The power management goals can include reduction of power costs. Datacenters typically consume large amounts of power. With the power management goal of reduced power costs, power from variable power sources is used to offset the usage of conventional power sources. For example, a datacenter can be configured with variable power sources such as multiple solar panels and/or windmills on the premises. The energy generated by these variable power sources is typically at a lower cost as compared to conventional sources such as fossil fuel power plants. Increasing the amount of energy supplied by these variable power sources reduces overall energy costs.

The cost of power provided by fossil fuel power plants can be dynamically priced. The dynamic pricing can be based on supply and demand. For example, in summer months, peak usage of electricity can occur in the afternoons as businesses and residences operate air conditioning and other electrical equipment. In such cases, the cost per kilowatt-hour of power may be higher in the afternoon than in the overnight hours. Therefore, it is not simply a matter of using power supplied by variable power sources, but also when that power is used, that can have an impact on the overall cost of power. Since variable power sources can produce energy at unpredictable times (e.g. when the winds are strong), the peak output of variable power sources does not always coincide with the peak cost of non-variable power sources. To accommodate this, embodiments may utilize a power cache. The power cache is configured to store energy from the variable power sources. The power cache is configured to dispatch the energy to the datacenter when it can be of the most benefit. In the case of a power management goal of reduced energy costs, this can be when the price of non-variable power is higher than average. As an example, if strong winds occur during overnight hours when non-variable power is priced lower than average, the power from a variable power source of windmills can be stored in the power cache. Later, the next afternoon, when the price of non-variable is higher than average, the previously generated power from the windmills is dispatched from the power cache, thus resulting in reduced cost savings. In embodiments, variable power sources include photovoltaic, super-capacitor, wind turbine, and water turbine.

The power cache can include, but is not limited to, a battery, a capacitor, and/or an electromechanical source. An electromechanical source can include flywheel-based energy storage where the flywheel is spun by a power source during an energy surplus condition, and the flywheel drives a generator to provide power during periods of increased energy demand. An electromechanical source can include pumps that pump water to a higher potential during a period of energy surplus and then release the water during a period of increased energy demand in order to generate electricity. An electromechanical source can include compressors that compress air to a higher pressure in a tank during a period of energy surplus and then release the compressed air to power a generator during a period of increased energy demand in order to generate electricity. Other electromechanical power caches are possible. The power cache can be replenished by one or more sources. In some cases, the power cache can be replenished from the grid via power utilities. In other cases, the power cache can be replenished from an alternate source such as a diesel generator, solar power, wind power, water power, and/or tidal power generation.

Embodiments can include comprising defining goals for power management within the datacenter. The power management goals can include reduction of carbon footprint. With this goal, the variable power sources (e.g. wind, solar (photovoltaic), tidal, etc.) that are generally considered renewable are used as much as possible to the extent they are available to offset the usage of non-variable power sources from fossil fuels.

Embodiments can further include hybrid power management goals. A hybrid power management goal can include a first goal during a first condition, and a second goal during a second condition. For example, a hybrid power management goal can include a power management goal of reduction of carbon footprint while the datacenter utilization is below a predetermined level, and then switch to a power management goal of availability when the datacenter utilization reaches/exceeds the predetermined level. Thus, during periods of low datacenter usage, the power management goal is reduced carbon footprint. In this phase of the hybrid power management goal, the power supplied by variable power sources is used to reduce the amount of power used from non-variable power sources (e.g. fossil fuel power sources). As more users log on to, or otherwise use services from the datacenter, the power management goal switches to maximum availability. In this phase of the hybrid power management goal, the power supplied by variable power sources is used to allow configuration of more datacenter equipment in 2N redundancy.

The flow 100 continues with provisioning variable power sources across the datacenter 112. The variable power sources can be renewable energy sources. In embodiments, the variable power sources include photovoltaic, supercapacitor, wind turbine, and water turbine. These variable power sources may be located on or near the premises of the datacenter. For example, solar panels and/or wind turbines can be installed on the roof of a datacenter, or nearby property surrounding the datacenter.

The flow 100 continues with obtaining non-variable power sources 120. The non-variable power sources can include, but are not limited to, coal power plants, natural gas power plants, nuclear power plants, and/or other non-variable power sources. The flow 100 continues with calculating dynamic power needs 130. The calculation of dynamic power needs includes considering usage levels of the datacenter. The usage can be based on historical usage trends, estimated user data, empirical observations, and so on. For example, a video streaming application may have peak usage on Friday nights, as viewership reaches its maximum. During weekday mornings, the video streaming application may have reduced usage as viewership reaches its minimum. In many cases, datacenter utilization is not completely predictable, so an operating margin may be established to accommodate unexpected increases in datacenter usage. In some cases, usage patterns may exist that are not readily apparent to a human observer, but can be detected through machine learning techniques such as neural networks, Bayesian filtering, and/or other suitable techniques. The machine learning can be combined with predictive analytics including meteorological forecasting to perform optimization of variable and non-variable power source usage to meet power management goals.

The flow 100 continues with determining the power capabilities of non-variable power 140. The non-variable power sources can include grid sources, such as fossil fuel power plants, hydroelectric power plants, and/or nuclear power plants. The amount of power each non-variable power source can supply is determined. This determination may be based on data provided by a power utility, empirical data, estimated data, or other suitable technique(s).

The flow 100 continues with determining the power capabilities of variable power 150. The variable power sources can include, but are not limited to, photovoltaic, supercapacitor, wind turbine, and water turbine. The power capabilities may be based on dynamic conditions and can include forecasts of the dynamic conditions. For example, if a meteorological forecast includes strong winds, then the estimated power capabilities of a wind energy source may be increased during that timeframe. Similarly, if the meteorological forecast includes overcast cloud cover, then the estimated power capabilities of a solar (photovoltaic) energy source may be reduced during that timeframe. The flow 100 may further include determining storage capacity for sections 152. A datacenter may be divided into sections, where each section includes one or more racks. Within a section, a power cache may be configured to store energy from variable power sources. The power cache can store the power generated from variable power sources whenever it is generated, and dispatch it at a later time when it is needed, based on the desired power management goals. In embodiments, each section may have one or more power caches associated with it. Each power cache has a storage capability for storing power generated from variable power sources. Embodiments include determining storage capacity for sections within the datacenter. In embodiments, the storage capacity is provided by batteries. The batteries can include Nickel Cadmium (NiCd) batteries, Nickel-Metal Hydride (NiMH) batteries, Lead Acid batteries, Lithium Ion (Li-ion) batteries, Lithium Polymer batteries, or other suitable battery type.

The flow 100 includes evaluation of dynamic power needs 160. The evaluation is based on the power capability of the one or more non-variable power sources and the one or more variable power sources. The flow 100 includes optimizing power utilization 162. This can include consideration of one or more power management goals, including hybrid power management goals. Based on the goals, and how much power is available from variable power sources and/or available from power caches, the variable power is dispatched accordingly. In some embodiments, minimum and maximum operating ranges of power caches may be established. For example, a power cache may have a minimum operating capacity of 20% and a maximum operating capacity of 90%. In some embodiments, the minimum and/or maximum operating range of a power cache may be adjusted based on a meteorological forecast, anticipated datacenter usage, or other criteria. For example, if the power cache is currently at its minimum operating capacity of 20%, and a meteorological forecast is predicting strong winds that will result in high output from a variable power source, the minimum operating capacity can be temporarily modified to 15%, freeing up additional storage capability in the power cache in anticipation of the increased output from the variable power source due to the increased winds. When the increased winds subside, the minimum operating capacity of the power cache can be restored to its default value (e.g. 20%). In a similar manner, the minimum and/or maximum operating capacity of a power cache may be adjusted based on anticipated load-side demand.

The flow 100 includes selecting power from variable power sources 170. These power sources can include solar, wind, tidal, solar thermal, and/or other power sources. The flow 100 continues with coupling the variable power sources to computing devices 180. The computing devices can include one or more servers within a datacenter. The coupling of the variable power sources can be direct, or the coupling may instead be through a power cache, where the power cache is replenished from the variable power sources. In this way, intelligent power control is used to dynamically adjust the balance of variable and non-variable power sources to achieve one or more power management goals. This can provide improved efficiency over a typical "worst case" static analysis that is often applied in datacenter power management estimates.

Figure 2:
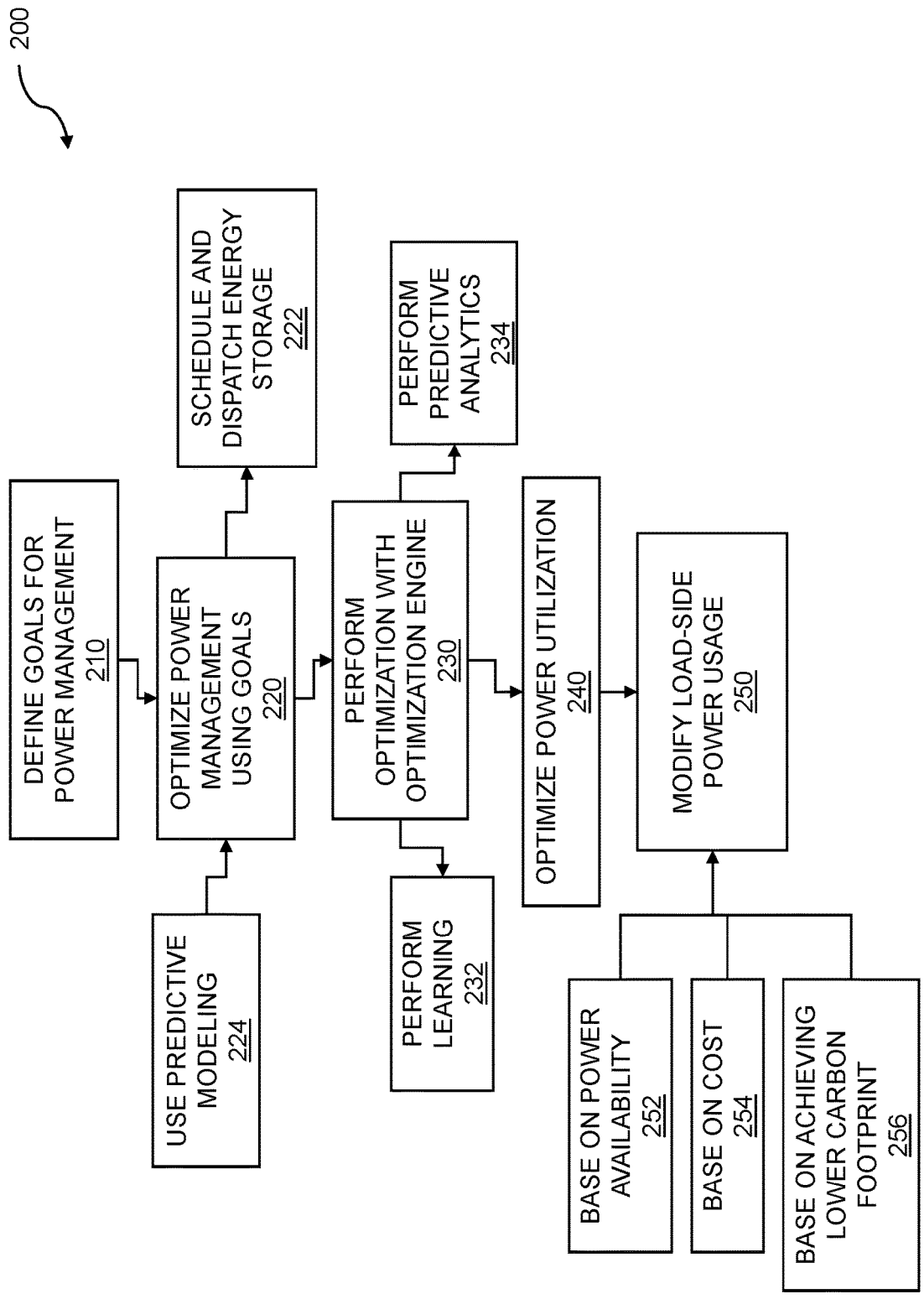
FIG. 2 is a flow diagram for achieving goals and modifying load-side requirements.

FIG. 2 is a flow diagram for achieving goals and modifying load-side requirements. The flow 200 includes defining goals for power management 210. The goals can include power availability goals, cost goals, and/or carbon footprint reduction goals. The goals can include hybrid power management goals that can change based on one or more conditions. In embodiments, the one or more conditions can include load-side demand and/or meteorological forecasts. The flow 200 includes optimizing power management using one or more goals 220. The flow 200 further includes scheduling and dispatching energy storage 222. The scheduling and dispatching can be based on the current costs of non-variable power. The flow 200 may include predictive modeling 224. The predictive modeling can include modeling of datacenter utilization, and/or modeling of variable power output (based on meteorological or other conditions).

The flow 200 includes performing optimization with an optimization engine 230. The optimization engine can include one or more processors and/or other hardware executing instructions to perform optimization based on the defined power management goals. The flow 200 can include performing predictive analytics 234. The predictive analytics can include forecasts of datacenter utilization, and/or forecasts of variable power output (based on meteorological or other conditions). In embodiments, an optimization engine performs learning and predictive analytics. The flow 200 can further include performing learning 232. The learning can be machine learning based on neural networks, heuristics, and/or other machine learning technique(s). The learning can be used to identify usage trends based on temporal conditions such as time of day, seasonal conditions, and the like. The learning can be based on other external factors including, but not limited to, financial data, entertainment/sports data, or other external data. For example, in a day of volatile stock trading, datacenter utilization for a financial application may be increased. As another example, for a day when a sports team is playing a championship game, viewership may be increased, increasing utilization of a video streaming application in a datacenter. These factors and others can be used in determining criteria to be used in performing an optimization.

The flow 200 continues with optimizing power utilization 240. The optimization can include determining the amount of power from variable power sources to be dispatched, and when that power is to be dispatched. The flow 200 can include modifying load-side power usage 250. The modification of load-side power can include changing the mode of operation for one or more applications executing on servers within the datacenter. The modification can include suspending or terminating one or more applications executing on servers within the datacenter. The modification can include limiting new logons of the applications executing on servers within the data center. The modification can include limiting bandwidth of resources streamed from the datacenter, and so on. The flow 200 can include modifying load-side power usage within the datacenter based on power availability 252 from the one or more variable power sources. The flow 200 can include modifying load-side power usage within the datacenter based on power cost 254 from the one or more variable power sources. In further embodiments, the flow 200 can include modifying load-side power usage within the datacenter based on achieving a lower carbon footprint 256 using the one or more variable power sources.

Figure 3A:
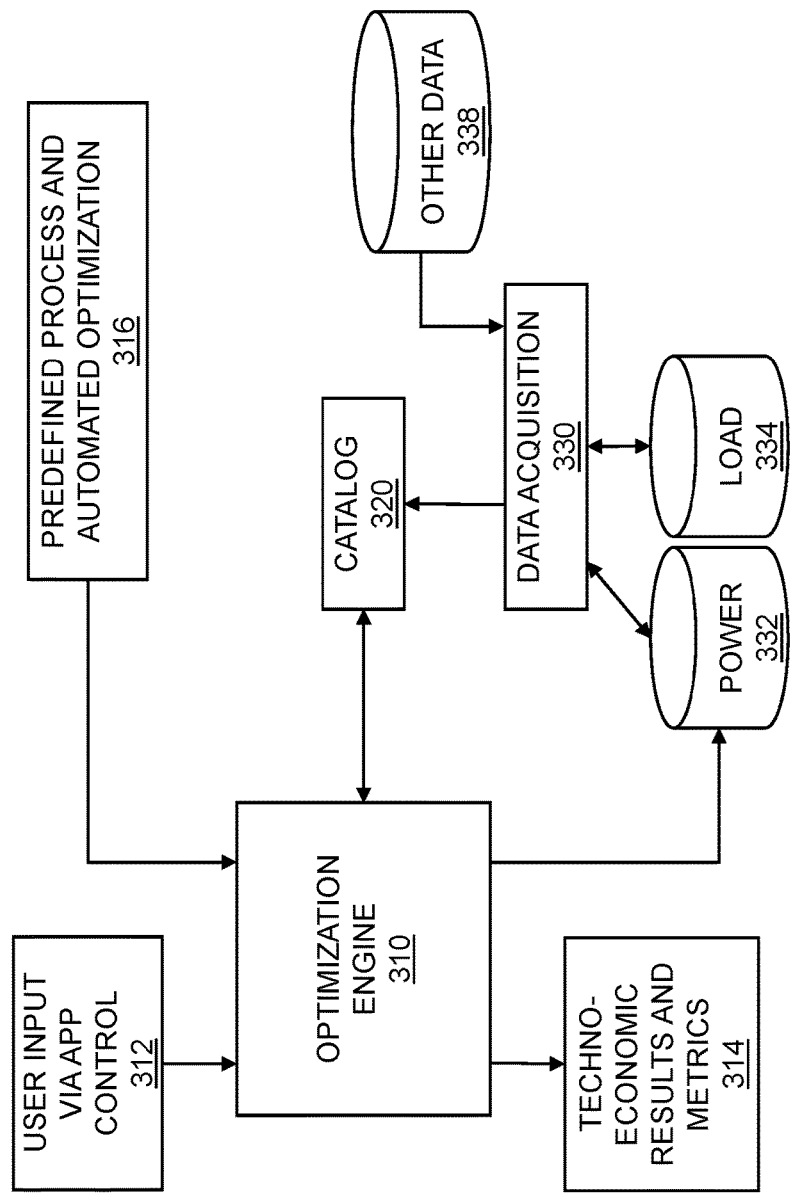
FIG. 3A shows an example using a multi-object optimization framework.

FIG. 3A shows an example 300 using a multi-object optimization framework. The example includes user input via application control 312. This can entail controlling the operation of applications on one or more data servers in order to alter the consumption of power. For example, in order to reduce load-side power consumption, one or more applications may be suspended, terminated, or placed into a reduced power consumption mode in order to reduce the amount of power the server is consuming. The example includes predefined process and automated optimization 316. This can entail input from users, machine-learned information, empirical data, mathematical model information and the like. This information can be used as a starting point for the optimization process.

The information from 312 and 316 is input to optimization engine 310. The optimization engine 310 can include one or more hardware elements such as processors, microcontrollers, and the like. The optimization engine 310 can further include one or more software programs and/or libraries executing on the one or more hardware elements. The example can further include catalog 320. The catalog 320 can be embodied in a database that includes various information pertaining to the datacenter. The information can include, but is not limited to, the number of racks within the datacenter, the number of servers within the datacenter, the hierarchical structure of the racks, the power redundancy mode of each server (e.g. 1N, 2N, etc.), power policy information, and/or heating and cooling (HVAC) configuration information. The catalog 320 can further include information from data acquisition module 330. The data acquisition module 330 can include instrumentation to measure available power 332 and instantaneous and/or average power load 334.

The data acquisition module 330 can further receive other data 338. In embodiments, the other data 338 can include weather forecast information. The weather forecast information may be used in determining estimated availability of power from variable power sources. As an example, if the weather forecast predicts overcast cloud conditions, that information can be used to estimate that power available from solar sources will be reduced on that day. In embodiments, the weather forecast may be retrieved from a weather server, newsfeed, or other suitable source for retrieving weather forecast information via a computer network.

The optimization engine 310 uses the information that is input to it to make decisions regarding the scheduling and dispatching of energy from variable power sources. The scheduling and dispatching can be based on one or more power management goals. As an example, based on a weather forecast for strong winds, and a power management goal of achieving a lower carbon footprint, the optimization engine may dispatch power from power caches that are replenished by wind turbines located in proximity to the datacenter. The power caches can include batteries, flywheels, compressed air stores, or other energy storage mechanisms.

A power cache can have an optimal discharge rate and/or an optimal charge rate. For example, different types of batteries have different optimal power cache parameters such as optimal discharge rates, optimal recharge rates, and optimal minimum power levels. In embodiments, the optimization engine 310 receives as input, the optimal power cache parameters and uses the optimal power cache parameters as criteria in determining how much power to dispatch from a power cache to offset power usage from non-variable power sources.

The optimization engine can output technoeconomic results and metrics 314. The technoeconomic results and metrics can include capital expense (CAPEX), operating expense (OPEX), levelized cost of energy (LCOE) expense, or total cost of ownership (TCO) information. The technoeconomic results and metrics can be rendered as a report, dashboard, graphical representation, or other suitable format. The technoeconomic results can include a percentage of power provided by variable power sources over a predetermined time range. For example, the technoeconomic results can include a percentage of power provided by renewable energy over the course of a day, week, month, or other time range. The technoeconomic results can include a cost savings, in dollars or other suitable currency, due to power provided by renewable energy over the course of a day, week, month, or other time range. The technoeconomic results can further include a breakdown of consumed variable power by source. For example, the technoeconomic results can include the percentage of variable power from wind, solar, and tidal sources. Other results and metrics can be rendered in addition to or instead of the aforementioned results and metrics.

Figure 3B:
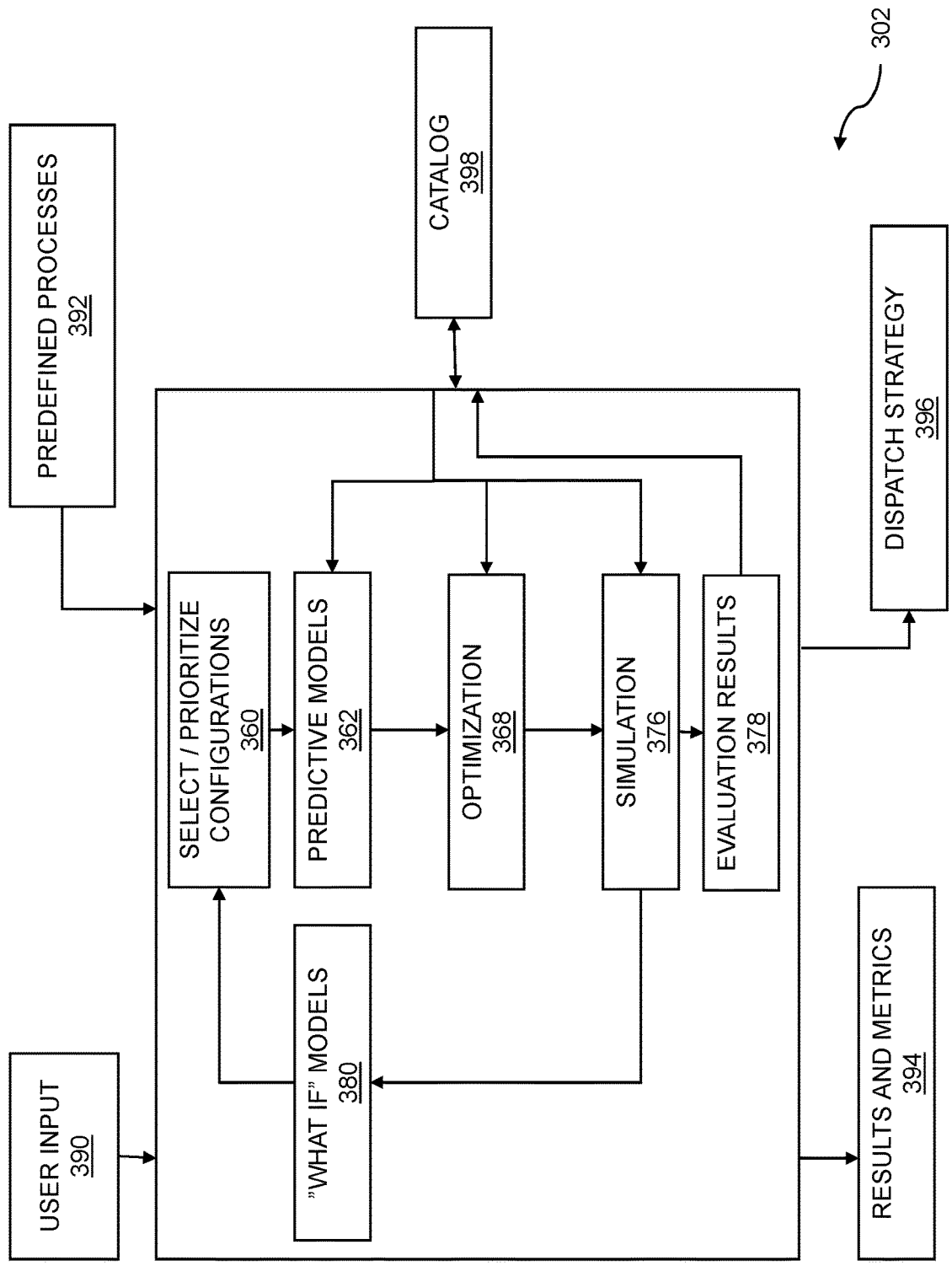
FIG. 3B shows optimization engine detail.

FIG. 3B shows optimization engine detail. The diagram 302 shows data from user input 390 being fed into the optimization process. Additional data from predefined processes 392 can also be input into the optimization process. The user input 390 can include configurations for applications executing on servers within the datacenter. The configurations can include suspending or terminating one or more applications. The configurations can include switching an application to an energy saving mode. In embodiments, the configurations can include switching an application to a reduced core mode. For example, an application may utilize up to 20 cores within a server as a default mode of operation. In reduced core mode, the application may utilize four cores within the server, reducing the amount of power consumed by the server, while still allowing the application to execute with reduced power.

The predefined processes 392 can include, but are not limited to, power policies, power management goals, and/or power redundancy configurations. The predefined processes, along with the user input, are fed to the optimization engine for processing and determination of an optimal power dispatch strategy for the given power management goals. The optimization engine includes selecting and/or prioritizing configurations 360. In embodiments, multiple power management goals can be prioritized. As an example, a first priority can be selected as a reduced cost goal, and a second priority can be selected as a reduced carbon footprint goal. The optimization engine can further include predictive models 362. The predictive models can include models of variable power source output based on meteorological forecasts for wind, sun, and other factors affecting the output of various variable power sources. The optimization 368 can utilize predictive models to determine an energy dispatch strategy. Embodiments can include simulation 376. The simulation can include execution of power scenarios. The scenarios can include a range of input parameters. For example, if winds are forecast for 15 miles per hour, a simulation scenario can be performed using steady winds of 15 miles per hour. In some embodiments, the simulation scenario can incorporate a variable power margin. In the aforementioned example of forecast winds of 15 miles per hour, a simulation scenario utilizing winds of 10 miles per hour can be performed, to enable a conservative estimate of the amount of power that gets contributed by variable power sources. The simulations are evaluated for feasibility based on the desired power management goals. The optimization engine includes evaluation of results 378 of the simulations. The simulation that comes closest to meeting the highest priority power management goal may be selected and used for the dispatch strategy 396. The evaluation results may also be stored within catalog 398 for future reference. In some embodiments, previously executed simulations may be retrieved from the catalog. This technique can facilitate a time savings for performing optimizations. Since optimizations can take a finite amount of time, retrieving a previously computed set of simulation results from the catalog 398 can be faster than the time it takes to compute the simulation results again. As an example, for a particular datacenter, a simulation including winds of 10 miles per hour and 75% sunny may be performed and stored in the catalog. The catalog can include an index of previously stored simulations. At a future time, if a simulation that includes winds of 10 miles per hour and 75% sunny is required, the simulation results can be retrieved from the catalog instead of being recomputed. Over time, as more simulation results are stored in the catalog, the catalog becomes more comprehensive as a source of simulation results. Hence, over time, the optimization engine can become more efficient and performance can be increased by utilizing data from catalog 398.

The output of the optimization can include results and metrics 394. The results and metrics can include capital expense (CAPEX), operating expense (OPEX), levelized cost of energy (LCOE) expense, or total cost of ownership (TCO) information. The results and metrics can be output as a text-based report, graphical representation (e.g. a dashboard), or other suitable format. The results and metrics can include a percentage of power provided by variable power sources over a predetermined time range. For example, the results and metrics can include a percentage of power provided by renewable energy over the course of a day, week, month, or other time range. The metrics and results can include a cost savings, in dollars or other suitable currency, due to power provided by renewable energy over the course of a day, week, month, or other time range. The results and metrics can further include a breakdown of consumed variable power by source. For example, the metrics and results can include the percentage of variable power from wind, solar, and tidal sources. The metrics and results can include an indication of how close the actual power usage of the datacenter was to a pre-established ideal goal. Other results and metrics can be output in addition to or instead of the aforementioned results and metrics.

The optimization engine can include the use of "What If" Models (WIM) 380. In embodiments, the WIM 380 are utilized in an iterative manner, where a simulation input is altered based on a conjecture scenario. The conjecture scenario may reveal that the data center is potentially vulnerable to an unplanned outage if one or more power supplies fail. In such cases, additional power supplies are added and the simulation is repeated with the newly added power supplies to determine if they resolve the issues detected during a previous simulation. The response to the conjecture scenario can include reprioritizing the configurations. As an example, if a conjecture scenario involving a partial loss of grid power indicates an outage would likely occur, the priority of power management goals can be changed. As an example, the power management goal may change from one of reduced cost to one of maximum availability. In this case, rather than try to use variable power sources to supplement the non-variable power sources when the cost of the non-variable power sources is most expensive, the optimization engine instead selects a power dispatch strategy that enables increasing the number of servers configured in 2N redundancy. In such cases, one or more servers that are in 1N redundancy may be dynamically configured to be in 2N redundancy.

Figure 4:
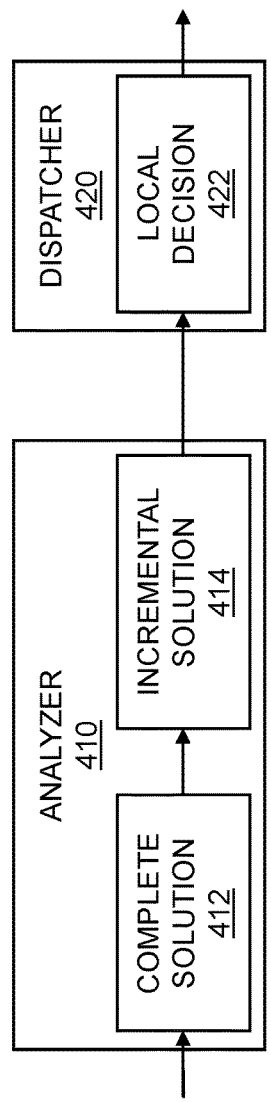
FIG. 4 illustrates an example of multi-stage decision making.

FIG. 4 is a diagram 400 showing an example of multistage decision making. The multistage decision making is hierarchical based on response time. An analyzer module includes a complete solution 412 which includes an overall strategy for achieving a power management goal. This may include long-term decisions (e.g. over days and weeks). An incremental solution 414 may include mid-term decision processes (e.g. minutes). The solution is communicated to a dispatcher 420, which executes a local decision process 422 in real-time. The complete solution 412 may specify an overall power management goal (e.g. maximum availability). The incremental solution 414 may include iterations of optimization engine computations to determine a specific strategy based on input conditions, including meteorological forecasts, tariff models, and other data that can impact the performance of variable power sources. The dispatcher 420 can receive the solutions from the analyzer 410 and perform real-time adjustments as part of a local decision process 422. For example, the dispatcher 420 may adjust the dispatching of energy from a power cache on a second by second basis, or even on a millisecond or microsecond basis, as needed to optimize the use of power from variable power sources for achievement of a desired power management goal.

Figure 5:
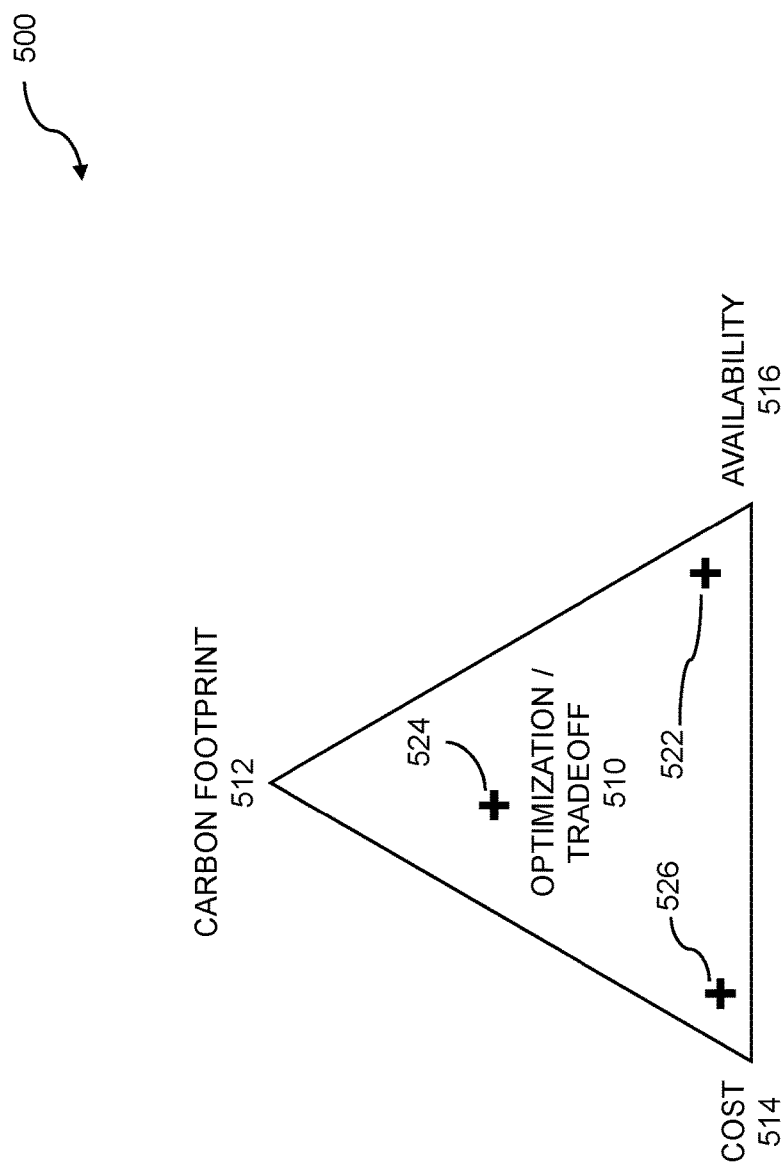
FIG. 5 shows individual and multi-objective optimization.

FIG. 5 shows a graph 500 indicating individual and multi-objective optimization. A power management goal can include a cost goal 514. With a cost goal, the primary objective is to minimize power costs for the datacenter. This can include strategically dispatching stored power from a power cache when the price of electricity from non-variable power sources is at a relative maximum, thereby reducing the amount of expensive power that the datacenter needs to purchase. Thus, embodiments include optimizing power utilization within the datacenter based on the evaluating the dynamic power needs. Furthermore, embodiments can include modifying load-side power usage within the datacenter based on power cost from the one or more variable power sources.

A power management goal can include an availability goal 516. With an availability goal, the primary objective is to ensure that the datacenter can provide functionality, regardless of power demands. This can include using available power from power caches and/or variable power sources to supplement non-variable power sources to configure as much of the datacenter as possible into a 2N power redundancy mode. In this way, a datacenter has a higher probability of avoiding disruptions due to power problems with grid power sources. Thus, embodiments can include modifying load-side power usage within the datacenter based on power availability from the one or more variable power sources.

A power management goal can include a carbon footprint goal 512. With a carbon footprint goal, the primary objective is to reduce the use of fossil fuels to power the datacenter. Thus, reducing the amount of power contributed by coal and natural gas power plants is a primary aspect of a carbon footprint goal. This can include using as much power from variable power sources as is possible, based on the output of the variable power sources. Thus, embodiments can include modifying load-side power usage within the datacenter based on achieving a lower carbon footprint using the one or more variable power sources.

Each of the three corners of the triangle shown in FIG. 5 represents one of the aforementioned power management goals. In addition, there can be an optimization/tradeoff 510 that achieves a "middle ground" between the goals. There can be varying degrees of optimization between goals. For example, data point 526 represents a multi-objective optimization that is primarily a cost reduction optimization, data point 522 represents a multi-objective optimization that is primarily a power availability optimization, and data point 524 represents a multi-objective optimization that represents a middle ground between carbon footprint reduction, cost reduction, and power availability. Power management goals may be dynamic and can change based on external factors. For example, a datacenter can have a default power management goal of reduced cost, and thus operate with a strategy based on data point 526. However, when severe weather is approaching the datacenter, which elevates the risk of a power outage, the datacenter can change the power management goal to one of power availability, and then operate with a strategy based on data point 522. When the severe weather passes, the datacenter can revert to the strategy based on data point 526. In this way, the datacenter can dynamically change the power management goal to accommodate external factors and maintain improved reliability while saving costs and reducing pollution from fossil fuels. Thus, embodiments include optimizing power management using one or more goals. In embodiments, the goals comprise maximizing power availability to the computing devices, minimizing datacenter cost, providing capacity repatriation, maximizing variable power source usage, or reducing the thermal requirements of the datacenter. The datacenter cost can be measured using a variety of techniques. In embodiments, datacenter cost includes capital expense (CAPEX), operating expense (OPEX), levelized cost of energy (LCOE) expense, or total cost of ownership (TCO).

Figure 6:
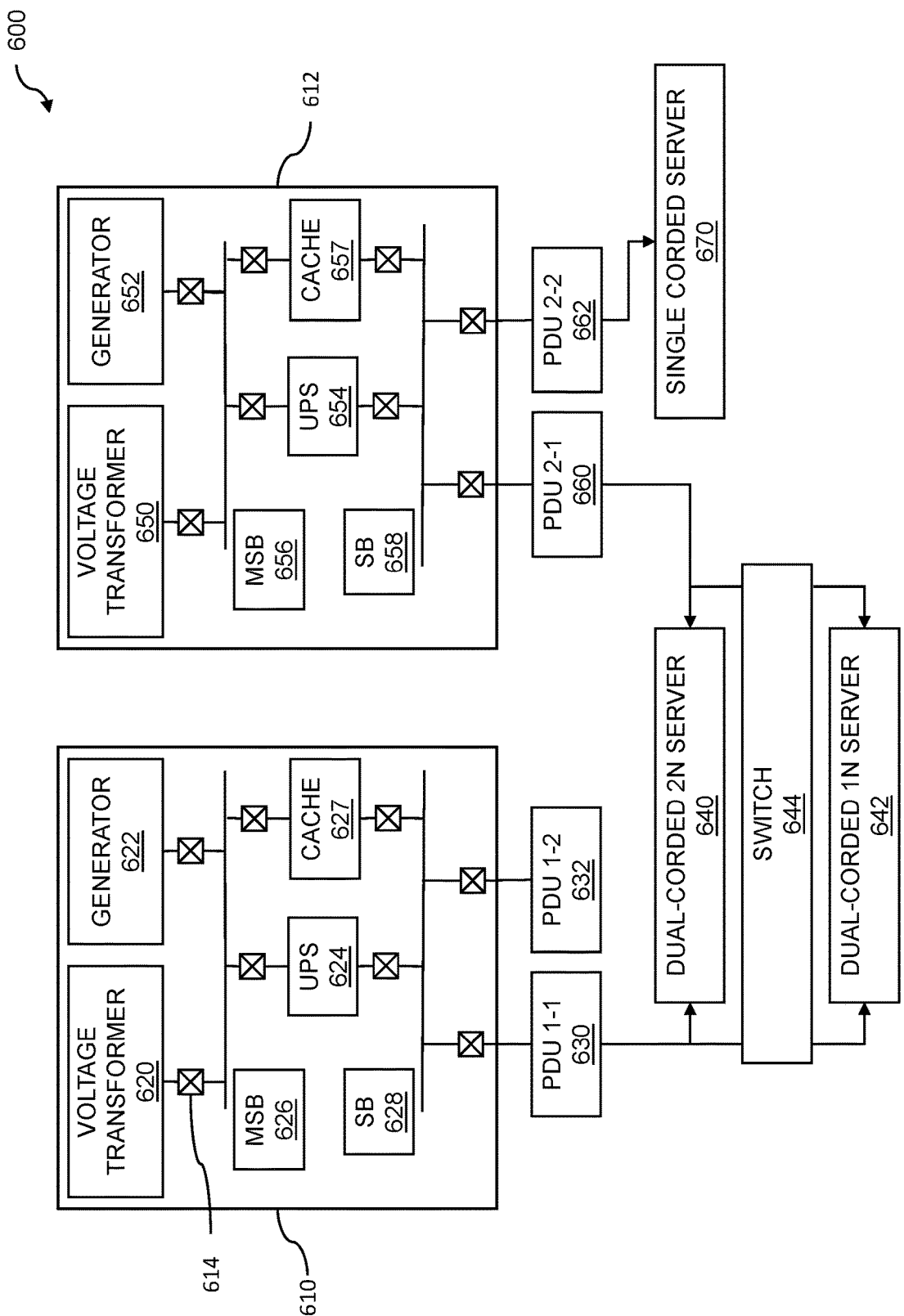
FIG. 6 illustrates an example datacenter power topology.

FIG. 6 shows an example datacenter power topology. The example 600 includes a first power source 610 and a second power source 612. In embodiments, the first power source 610 and second power source 612 may be grid sources. As an example, power source 610 may be a grid source powered by a first substation and power source 612 may be a grid source powered by a second substation. In this way, if one substation has a failure, the other substation may be used to continue operation of the connected power loads.

First power source 610 includes a generator 622. Generator 622 may include coal, natural gas, diesel, nuclear, wind, solar, hydroelectric, geothermal, or other suitable technology. A voltage transformer 620 converts the output of the generator to a desired voltage level for further power conditioning. Similarly, second power source 612 includes a voltage transformer 650 and generator 652. Various elements within the first power source 610 are coupled to a breaker, indicated generally as 614. The breaker can be used to decouple the element in the event of a failure, maintenance, or other scenario requiring decoupling.

The first power source 610 and second power source 612 can include grid power, locally generated power such as solar and wind, backup power such as diesel generator sets, and so on. The power sources 610 and 612 include master switch blocks (MSB) 626 and 656. The power sources can also include one or more switch blocks (SB), indicated as 628 and 658. The MSB is used to switch from externally sourced power such as grid, locally generated power, etc., to the uninterruptable power supplies (UPS) 624 and 654. The switch to UPS can occur due to a power outage. The first power source 610 is connected to power distribution units (PDU) 630 and 632. The second power source 612 is connected to power distribution units 660 and 662.

Electrical equipment such as dual corded equipment, single corded equipment, etc. can be connected to one or more PDUs. Dual corded servers can be connected to multiple sources. Thus, dual corded 2N server 640 can be connected to PDUs 630 and 660, and dual corded 1N server 642 can be connected to PDUs 630 and 660. Single corded server 670 can be connected to a single PDU 662. Power control switch 644 can be coupled to the dual-corded 1N server 642. Using dynamic redundancy, server 642 can be dynamically disconnected from PDU 630 or PDU 660 by switch 644. The switch 644 can be used to turn on and off equipment, to direct dynamic power from one equipment rack to another, to monitor SLA battery charge levels and discharge rates, etc.

Thus, as shown in example 600, dual-corded 2N server 640 is configured as a permanent 2N redundancy server. It is always in 2N redundancy mode, as it is not coupled to the output of switch 644. Single-corded server 670 is configured in permanent 1N redundancy. Dual-corded 1N server 642 is configured as dynamic 2N redundancy. Depending on the output mode of switch 644, server 642 can be dynamically set to 1N redundancy mode or 2N redundancy mode.

The first power source 610 and/or second power source 612 may further include a power cache. As shown in example 600, power source 610 includes power cache 627 and power source 612 includes power cache 657. In some embodiments, power policies are used to establish behavior based on limits for power consumption, power generation, and other criteria. Rules are established to provide fractional power sharing and control under certain conditions. Power caches are used to supplement power sources under conditions of peak power requirements. When power requirements are below a threshold set forth in a power policy, the power caches are replenished. The power policies enable a convenient and effective way to manage the dynamic requirements of a modern datacenter. These policies enable increased power utilization and greater efficiency given a specific set of power sources and supplies. By use of policies, underused and unexploited power capabilities can be unlocked to enhance power utilization within a datacenter. In some cases, power policies can be employed to reduce overall costs of utility power provided to datacenters. Power policies can also be used to establish rules and/or conditions to enable dynamic redundancy requirements.

Figure 7:
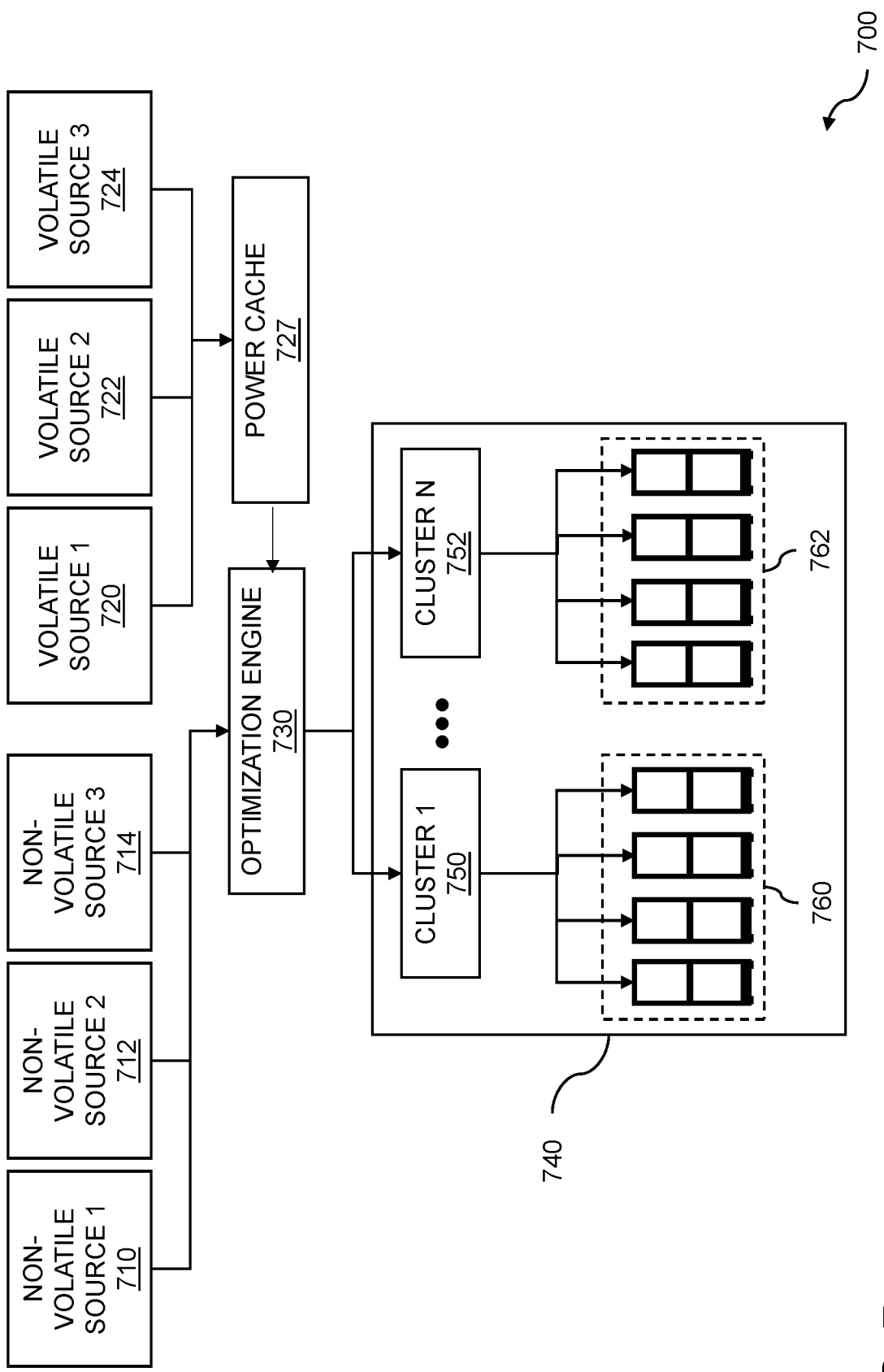
FIG. 7 shows example non-variable and variable power sources feeding a datacenter.

FIG. 7 shows an example 700 with non-variable and variable power sources feeding a datacenter 740. The datacenter 740 is supplied by non-volatile power sources 710, 712, and 714, and volatile power sources 720, 722, and 724. The non-volatile power sources can include, but are not limited to, coal power plants, natural gas power plants, nuclear power plants, and/or hydroelectric power plants. The volatile power sources can include, but are not limited to, solar (photovoltaic), wind turbine, and/or tidal power. The amount of power from each non-volatile and volatile power source is provided as an input to optimization engine 730. The optimization engine 730 computes the amount of power each source contributes to the operation of the data center. This amount can be dynamically computed and may change over time as power generation and power consumption conditions change.

The volatile sources 720, 722, and 724 feed power cache 727. In embodiments, power cache 727 can include, but is not limited to, a battery, a capacitor, and/or an electromechanical source. Thus, embodiments include selecting a power source from the one or more variable power sources to provide power to the datacenter. The power level of the power cache 727 may be provided as an input to the optimization engine 730. During datacenter operation, the optimization engine 730 determines the percentage of power supplying the datacenter from the non-volatile source(s), and the percentage of power supplying the datacenter from the power cache 727. Since the power cache 727 stores energy that is supplied from the volatile power sources, there is flexibility in when the power from the volatile power sources is to be dispatched. Thus, as an example, if it is windy at night, where power demand is low, the power generated by the wind turbines can be used to replenish the power cache. The power from the power cache can be dispatched as needed at a later time to achieve a desired power management goal. Thus, in embodiments, optimizing includes scheduling and dispatching energy storage.

The power sources, which can include the volatile and non-volatile sources just discussed, can also include deterministic and non-deterministic power sources. Deterministic power sources can include power sources that can provide a power level which can be known or set a priori. Deterministic power sources can include power generated by power plants, for example, where the power plants can be fueled by coal, natural gas, nuclear fuel, geothermal energy, and so on. By connecting to one of these deterministic power sources, specific amounts of power can be provided to power loads such as the loads found in datacenters. The deterministic power sources can be used in power need prediction models, power provisioning, power scheduling, and so on. Non-deterministic power sources can include power generated by sunlight, wind, waves, etc., and to an extent hydro. The amount of power provided by these power sources may not be known a priori. The amount of power that can be generated by a photovoltaic array can depend on whether the power need occurs during the day or at night, summer or winter, a clear day or an overcast day, and so on. The amount of power that can be generated by a wind turbine depends on the presence of wind, wind speed, etc. The amount of power that can be generated by a wave power generator depends on the presence of waves, wave frequency, wave magnitude, and the like. Hydro power generation can be dependent on the amount of water available for power generation. The amount of water available can be influenced by competing needs for water, drought, etc. The non-deterministic power sources can be used for supplemental power needs, sourcing power that can be stored for future use, and so on.

Another source of power can include power generated by one or more fuel cells. A fuel cell can be based on a chemical cell including an electrochemical cell. The chemical energy of a fuel such as hydrogen or a fuel containing hydrogen can be converted into electricity. The electricity generated by the fuel cell can be applied to meet various power needs such as those power needs found within a datacenter. In the fuel cell, a reaction takes place between the hydrogen and an oxidizing agent. The oxidizing agent can include oxygen, air, and so on. The reaction that takes place within the fuel cell to produce the electricity can continue as long as fuel and oxygen are provided to the cell. The fuel cell differs from a battery in that the battery contains the chemicals that are used to produce electricity, and in the cases of rechargeable batteries, can be recharged periodically by applying electricity to the batteries. The fuel cell can only produce electricity by consuming a persistent supply of both fuel and oxidizer, such as hydrogen and oxygen respectively. The fuel cell is "recharged" not by providing electricity to it, but rather by refilling hydrogen and oxygen supplies.

Fuel cells can include an anode, a cathode, and an electrolyte. The type of fuel cell is based on the electrolyte that is included in the fuel cell. The electrolyte in a fuel cell can include a polymer electrolyte membrane, alkaline, phosphoric acid, and so on. Ethanol, methanol, and hydrocarbon fuels can also be used. The electrolyte permits protons including positively charged hydrogen ions to transfer through the electrolyte between the two sides of the fuel cell. A catalyst at the anode enables oxidation of the fuel (e.g. hydrogen) to generate protons. The protons that result from the oxidation can flow from through the electrolyte from the anode to the cathode. Electrons can be drawn from the anode, through a circuit external to the fuel cell, to the cathode. The flow of electrons, or current, can provide electrical power to the external circuit. A catalyst at the cathode causes a reaction between the hydrogen ions (protons), oxygen, and electrons. The result of the reaction at the cathode can include water ($H_2O$), The datacenter 740 may be organized into multiple clusters, where each cluster comprises one or more sections that include groups of racks. As shown, datacenter 740 includes cluster 750 which includes group 760 and cluster 752 which includes group 762. While only two groups and two clusters are shown in FIG. 7, in practice, a datacenter can have more than two clusters and each cluster can be comprised of multiple groups. Furthermore, while in the example shown, each group (760, 762) includes four racks, in practice, each group can include more or fewer racks than shown in FIG. 7.

Figure 8:
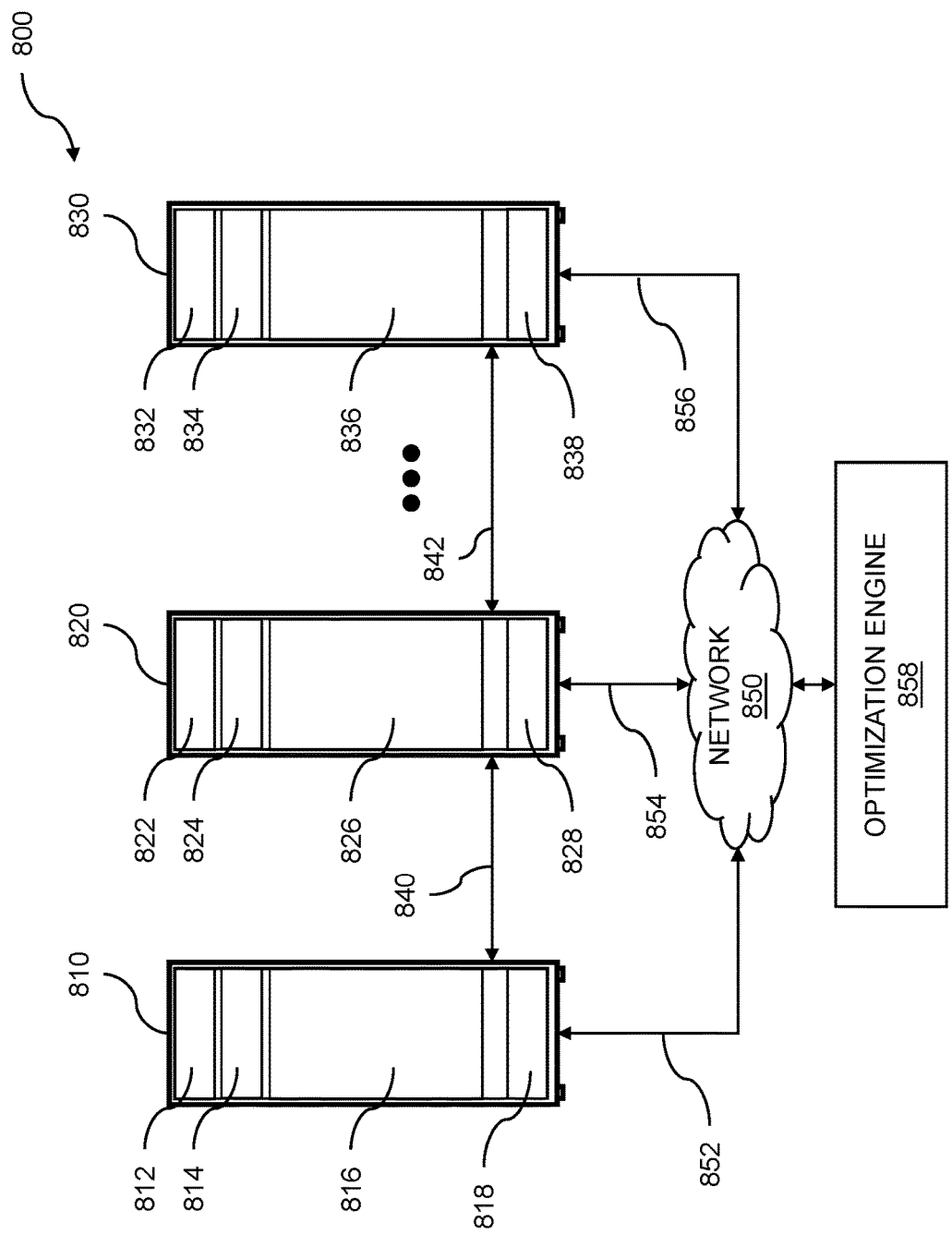
FIG. 8 illustrates an example datacenter rack configuration.

FIG. 8 shows a datacenter rack configuration. A datacenter can include multiple data racks. Example 800 includes three data racks, indicated as rack 810, rack 820, and rack 830. While three data racks are shown in example 800, in practice, there can be more or fewer data racks. The data rack 810 includes a power cache 812, a first server 814, a second server 816, and a power supply 818. The power supply 818 can be used for AC-DC conversion and/or filtering of power to be used by the servers 814 and 816, as well as replenishment of the power cache 812. In embodiments, the power cache 812 includes an array of rechargeable batteries. In embodiments, the batteries include, but are not limited to, lead-acid, nickel metal hydride, lithium ion, nickel cadmium, and/or lithium ion polymer batteries. Similarly, the data rack 820 includes a power cache 822, a server 824, a server 826, and a power supply 828. Furthermore, the data rack 830 includes a power cache 832, a first server 834, a second server 836, and a power supply 838. The data racks are interconnected by communication links 840 and 842. The communication links can be part of a local area network (LAN). In embodiments, the communication links include a wired Ethernet, Gigabit Ethernet, or another suitable communication link. The communication links enable each data rack to send and/or broadcast current power usage, operating conditions, and/or estimated power requirements to other data racks and/or upstream controllers such as a cluster controller. Thus, in the example 800, a power cache can be on each of the multiple data racks within the data center. In embodiments, the power cache includes multiple batteries spread across the multiple data racks.

Each rack may be connected to a communication network 850. Rack 810 is connected to network 850 via communication link 852. Rack 820 is connected to network 850 via communication link 854. Rack 830 is connected to network 850 via communication link 856. The optimization engine 858 can retrieve operating parameters from each rack. In embodiments, the operating parameters are retrieved via SNMP (Simple Network Management Protocol), TR069, or other suitable protocol for reading information. Within a Management Information Base (MIB), various Object Identifiers (OIDs) may be defined for parameters such as instantaneous power consumption, average power consumption, number of cores in use, number of applications currently executing on a server, the mode of each application (suspended, running, etc.), internal temperature of each server and/or hard disk, and fan speed. Other parameters may also be represented within the MIB. Using the information from the MIB, the optimization engine 858 may derive a new dispatch strategy in order to achieve a power management goal. Thus, embodiments include performing the optimizing with an optimization engine.

Figure 9:
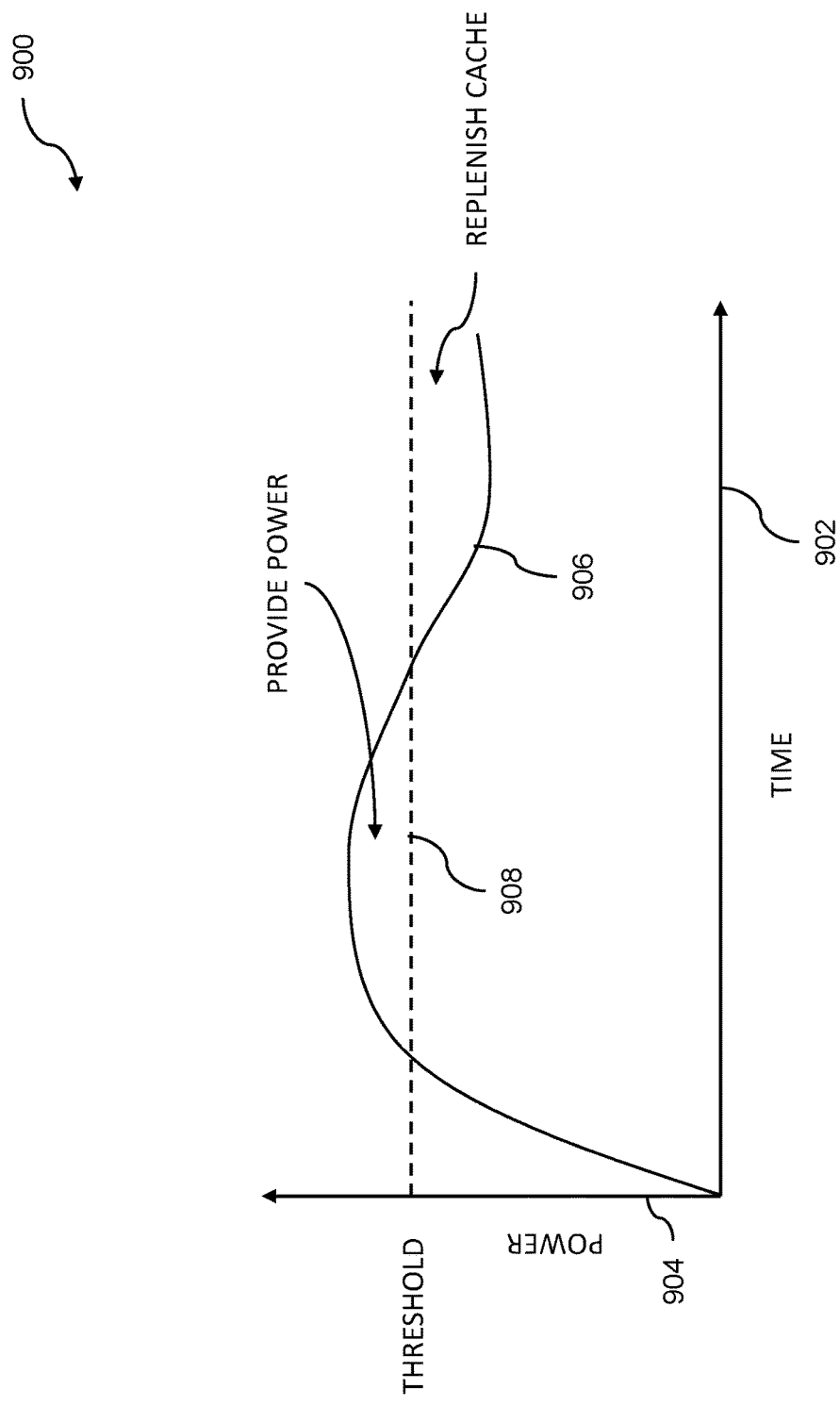
FIG. 9 illustrates a power consumption curve.

FIG. 9 illustrates a power consumption curve. A graph 900 includes a horizontal axis 902 representing time and a vertical axis 904 representing power consumption of a power load (such as a datacenter group, section, cluster, or rack). A predetermined threshold 908 is established based on a power policy. The power policy can be defined by an administrator at the data center, a local power utility, or the like. The curve 906 represents the power consumption of a power load over time. During periods where the curve 906 is above the threshold 908, power is provided to the load by the power cache. During periods where the curve 906 is below the threshold 908, the power cache is replenished. In the case where the power cache comprises one or more batteries, the batteries are charged when the curve 906 is below the threshold 908. In the case of an electromechanical power cache such as a flywheel, the flywheel is spun up during periods of replenishment, and the flywheel drives a generator during periods where power is provided. In embodiments, enabling the power cache comprises peak shaving. In embodiments, the power cache is configured to be replenished from variable power sources. The variable power sources may be volatile power sources. The variable power sources may be renewable power sources. The variable power sources may be so-called "green energy" sources such as wind, tidal, and/or solar power sources. In this way, when power from a power cache is used to offset/reduce usage of a non-variable power source such as a fossil fuel grid power source, then effectively, a renewable energy source is reducing the amount of fossil fuel sourced power needed to operate the datacenter.

Figure 10:
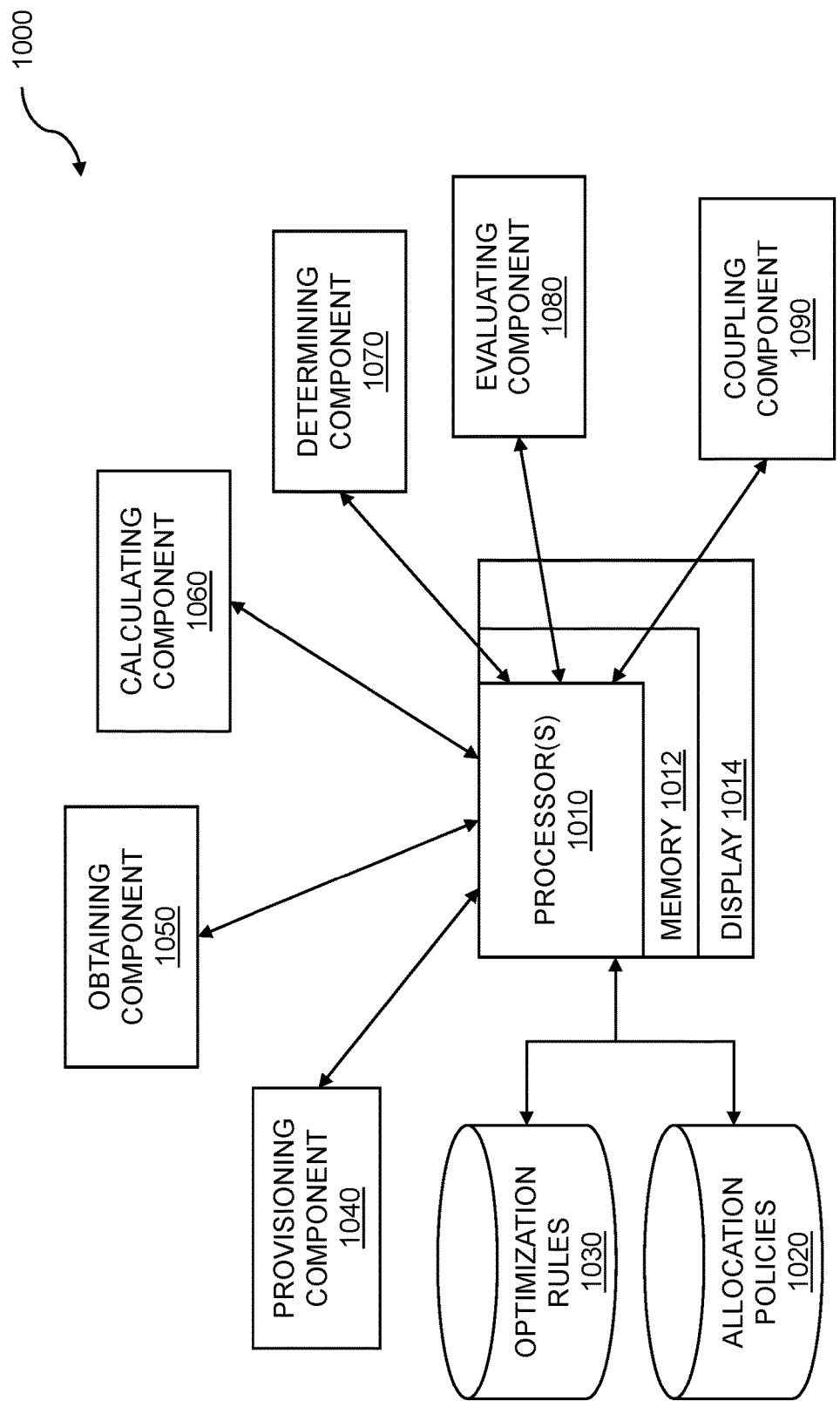
FIG. 10 is a system diagram for datacenter power management using variable power sources.

FIG. 10 is a system diagram for datacenter power management using variable power sources. The system of FIG.

10 can include a computer program product embodied in a non-transitory computer readable medium for power management comprising code which causes one or more processors to perform operations of: provisioning one or more variable power sources across a datacenter to provide power to computing devices within the datacenter; obtaining one or more non-variable power sources across the datacenter to provide power to the datacenter; calculating dynamic power needs for the computing devices within the datacenter; determining power capabilities of the one or more non-variable power sources; determining power capabilities of the one or more variable power sources; evaluating the dynamic power needs that were calculated in light of the power capability of the one or more non-variable power sources and the one or more variable power sources; and coupling the one or more non-variable power sources and the one or more variable power sources to the computing devices based on the evaluation of the dynamic power needs.

FIG. 10 shows a system diagram for datacenter power management using variable power sources. The system 1000 can include one or more processors 1010 and a memory 1012 which stores instructions. The memory 1012 is coupled to the one or more processors 1010, wherein the one or more processors 1010 can execute instructions stored in the memory 1012. The memory 1012 can be used for storing instructions, for storing databases of power sources, power caches, and power loads, for storing information pertaining to load requirements or redundancy requirements, for storing power policies, for system support, and the like. Information about the simulations of dynamic power scenarios can be shown on a display 1014 connected to the one or more processors 1010. The display can comprise a television monitor, a projector, a computer monitor (including a laptop screen, a tablet screen, a netbook screen, and the like), a smartphone display, a mobile device, or another electronic display.

The system 1000 includes allocation policies 1020. In embodiments, the allocation policies 1020 are stored in a networked database, such as a structured query language (SQL) database. The allocation policies 1020 can include limits, such as power consumption limits, as well as switch configurations when certain conditions are met. For example, when conditions allow peak shaving to take place, and surplus power exists, the power policies can identify switches and their configurations to allow replenishing of the power caches.

The system 1000 includes optimization rules 1030. The optimization rules 1030 can include rules for various power management goals, such as optimization of power costs, optimization of power availability, and/or optimization (or reduction) of carbon footprint.

The system 1000 includes provisioning component 1040. The provisioning component provisions one or more variable power sources across a datacenter to provide power to computing devices within the datacenter. This can include configuring connections via switches, programmable relays, and other suitable mechanisms for connecting the one or more variable power sources. The one or more variable power sources can include, but are not limited to, solar (photovoltaic), wind, and/or tidal power generation.

The system 1000 includes obtaining component 1050. The obtaining component obtains one or more non-variable power sources across the datacenter to provide power to the datacenter. This can include configuring connections via switches, programmable relays, and other suitable mechanisms for connecting the one or more non-variable power sources. The one or more variable power sources can include, but are not limited to, power plant (grid) sources and/or locally generated power.

The system 1000 includes calculating component 1060. The calculating component is configured to calculate dynamic power needs for the computing devices within the datacenter. This can include reviewing past power consumption trends, as well as examining forecast data for predicting future power consumption estimates. Thus, in embodiments, optimizing power management includes predictive modeling for dispatching of energy storage.

The system 1000 includes determining component 1070. The determining component determines power capabilities of the one or more non-variable power sources and the one or more variable power sources. The determining component may query information via SNMP or other suitable protocol. The determining component may further utilize data such as meteorological forecasts and tidal schedules to estimate future power capability of variable power sources such as solar, wind and/or tidal power generation.

The system 1000 includes evaluating component 1080. The evaluating component evaluates the dynamic power needs that were calculated in light of the power capability of the one or more non-variable power sources and the one or more variable power sources. The evaluation can include providing a variety of input data to an optimization engine. The input data can include power capabilities of variable and non-variable sources as ascertained by determining component 1070. The evaluating component can include processes for determining a mix of power from non-variable power sources and variable power sources in order to best achieve one or more power management goals.

The system 1000 includes coupling component 1090. The coupling component couples the one or more non-variable power sources and the one or more variable power sources to the computing devices based on the evaluation of the dynamic power needs.

The system 1000 includes a computer system for power management comprising: a memory which stores instructions; one or more processors attached to the memory wherein the one or more processors, when executing the instructions which are stored, are configured to: provision one or more variable power sources across a datacenter to provide power to computing devices within the datacenter; obtain one or more non-variable power sources across the datacenter to provide power to the datacenter; calculate dynamic power needs for the computing devices within the datacenter; determine power capabilities of the one or more non-variable power sources; determine power capabilities of the one or more variable power sources; evaluate the dynamic power needs that were calculated in light of the power capability of the one or more non-variable power sources and the one or more variable power sources; and couple the one or more non-variable power sources and the one or more variable power sources to the computing devices based on the evaluation of the dynamic power needs.

Disclosed embodiments can include a computer program product embodied in a non-transitory computer readable medium for power management, the computer program product comprising code which causes one or more processors to perform operations of: provisioning one or more variable power sources across a datacenter to provide power to computing devices within the datacenter; obtaining one or more non-variable power sources across the datacenter to provide power to the datacenter; calculating dynamic power needs for the computing devices within the datacenter; determining power capabilities of the one or more non-variable power sources; determining power capabilities of the one or more variable power sources; evaluating the dynamic power needs that were calculated in light of the power capability of the one or more non-variable power sources and the one or more variable power sources; and coupling the one or more non-variable power sources and the one or more variable power sources to the computing devices based on the evaluation of the dynamic power needs.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate, execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A computer-implemented method for power management comprising:
provisioning one or more variable power sources across a datacenter to provide power to computing devices within the datacenter, wherein the one or more variable power sources include renewable power sources;
provisioning one or more non-variable power sources across the datacenter to provide power to the datacenter;
calculating dynamic power needs for the computing devices within the datacenter;
determining power capabilities of the one or more non-variable power sources and determining power capabilities of the one or more variable power sources under a simulated conjecture scenario factoring in natural cyclic behaviors of the variable power sources and the natural cyclic behaviors of the variable power sources;
evaluating the dynamic power needs for the computing devices based on the power capabilities of the one or more non-variable power sources and the power capabilities of the one or more variable power sources determined under the simulated conjecture scenario; and
coupling the one or more non-variable power sources and the one or more variable power sources to the computing devices based on the evaluating of the dynamic power needs and the simulated conjecture scenario; and
modifying a level of power source redundancy for at least one of the computing devices based at least in part upon the power capabilities of the variable power sources.

2. The method of claim 1 further comprising modifying the level of power source redundancy for at least one of the computing devices for a certain variable power source according to a natural cyclic variation for the certain variable power source.

3. The method of claim 2 wherein the natural cyclic variation for the certain variable power source includes a daily or seasonal cycle.

4. The method of claim 2 wherein the variable power sources include photovoltaic, supercapacitor, wind turbine, and water turbine.

5. The method of claim 2 wherein the natural cyclic variation includes light cycles, wind cycles, or tidal cycles.

6. The method of claim 1 wherein the evaluating includes predictive modeling for dispatching of energy storage.

7. The method of claim 1 further comprising performing the evaluating with an optimization engine.

8. The method of claim 7 wherein the optimization engine performs learning and predictive analytics.

9. The method of claim 1 wherein the simulated conjecture scenario comprises maximizing power availability to the computing devices, minimizing datacenter cost, providing capacity repatriation, maximizing variable power source usage, or reducing thermal requirements of the datacenter.

10. The method of claim 9 wherein the datacenter cost includes capital expense (CAPEX), operating expense (OPEX), levelized cost of energy (LCOE) expense, or total cost of ownership (TCO).

11. The method of claim 1 further comprising determining storage capacity for sections within the datacenter.

12. The method of claim 11 wherein the storage capacity is provided by batteries.

13. The method of claim 1 further comprising optimizing power utilization within the datacenter based on the evaluating the dynamic power needs.

14. The method of claim 1 further comprising selecting a power source from the one or more variable power sources to provide power to the datacenter.

15. The method of claim 1 further comprising modifying load-side power usage within the datacenter based on power availability from the one or more variable power sources.

16. The method of claim 1 further comprising modifying load-side power usage within the datacenter based on power cost from the one or more variable power sources.

17. The method of claim 1 further comprising modifying load-side power usage within the datacenter based on achieving a lower carbon footprint using the one or more variable power sources.

18. The method of claim 1 further comprising defining one or more goals for power management within the datacenter, wherein the one or more goals are achieved using predictive modeling.

19. The method of claim 18 further comprising optimizing power management using the one or more goals, wherein the optimizing includes scheduling and dispatching energy storage.

20. The method of claim 19 further comprising storing energy within the datacenter using a power cache, wherein the energy stored came from the renewable power sources.

21. The method of claim 19 wherein the optimizing power management within the datacenter is based on machine learned information.

22. The method of claim 20 further comprising dispatching power from the power cache later in time based on the one or more goals for power management.

23. The method of claim 1 wherein the simulated conjecture scenario is obtained by retrieving a previously computed set of simulation results from a catalog.

24. A computer program product embodied in a non-transitory computer readable medium for power management, the computer program product comprising code which causes one or more processors to perform operations of:
provisioning one or more variable power sources across a datacenter to provide power to computing devices within the datacenter wherein the one or more variable power sources include renewable power sources, wherein the one or more variable power sources have natural cyclic variations;
provisioning one or more non-variable power sources across the datacenter to provide power to the datacenter;
calculating dynamic power needs for the computing devices within the datacenter;
determining power capabilities of the one or more non-variable power sources and determining power capabilities of the one or more variable power sources under a simulated conjecture scenario;
evaluating the dynamic power needs for the computing devices based on the power capabilities of the one or more non-variable power sources and the power capabilities of the one or more variable power sources determined under the simulated conjecture scenario; and
coupling the one or more non-variable power sources and the one or more variable power sources to the computing devices based on the evaluating of the dynamic power needs and the simulated conjecture scenario, wherein the coupling modifies a level of power source redundancy for at least one of the computing devices based at least in part upon the natural cyclic variations of the one or more variable power sources.

25. A computer system for power management comprising:
- a memory which stores instructions;
    - one or more processors attached to the memory wherein the one or more processors, when executing the instructions which are stored, are configured to:
- provision one or more variable power sources across a datacenter to provide power to computing devices within the datacenter wherein the one or more variable power sources include renewable power sources;
- provision one or more non-variable power sources across the datacenter to provide power to the datacenter;
- calculate dynamic power needs for the computing devices within the datacenter;
- determine power capabilities of the one or more non-variable power sources and determine power capabilities of the one or more variable power sources under a simulated conjecture scenario, wherein the simulated conjecture scenario includes a natural cyclic variation for the one or more variable power sources;
- evaluate the dynamic power needs for the computing devices based on the power capabilities of the one or more non-variable power sources and the power capabilities of the one or more variable power sources determined under the simulated conjecture scenario; and
- couple the one or more non-variable power sources and the one or more variable power sources to the computing devices based on evaluation of the dynamic power needs and the simulated conjecture scenario, wherein the coupling modifies a level of power source redundancy for at least one of the computing devices based at least in part upon the natural cyclic variation of the one or more variable power sources.

* * * * *